Dec. 27, 1932.   B. G. JOHNSON   1,892,348
ENGINE CRANKING MECHANISM
Original Filed Feb. 3, 1931   2 Sheets-Sheet 1

Inventor
Bror G. Johnson
by J. Daniel Stuwe
Attorney.

Dec. 27, 1932.  B. G. JOHNSON  1,892,348
ENGINE CRANKING MECHANISM
Original Filed Feb. 3, 1931  2 Sheets-Sheet 2

Inventor
Bror G. Johnson
by J. Daniel Stuwe
Attorney.

Patented Dec. 27, 1932

1,892,348

UNITED STATES PATENT OFFICE

BROR G. JOHNSON, OF CHICAGO, ILLINOIS

ENGINE CRANKING MECHANISM

Original application filed February 3, 1931, Serial No. 513,164. Divided and this application filed June 8, 1931. Serial No. 542,780.

This invention relates to engine cranking mechanism; and more particularly to mechanism for cranking the engine of an automobile.

This application is a division of my prior application for patent for automobile, Serial No. 513,164, filed February 3, 1931.

One of the main objects of this invention is to provide a novel and improved engine cranking mechanism wherein the several members can be readily moved into operative engagement for cranking the engine, and can likewise be readily moved apart into an idle or non-cranking position.

Another object is to provide a cranking mechanism for cranking the engine of an automobile having a front wheel drive, wherein the members of said mechanism are normally retained in the non-cranking position, and said mechanism can be readily actuated to place and retain these members in and out of the operative cranking position.

Various other objects and advantages will become apparent from the following description, taken in connection with the accompanying drawings, in which the invention is shown in its preferred form; it being understood that other arrangements and forms of construction may be resorted to for carrying out the objects and purposes of this invention.

Figure 1:
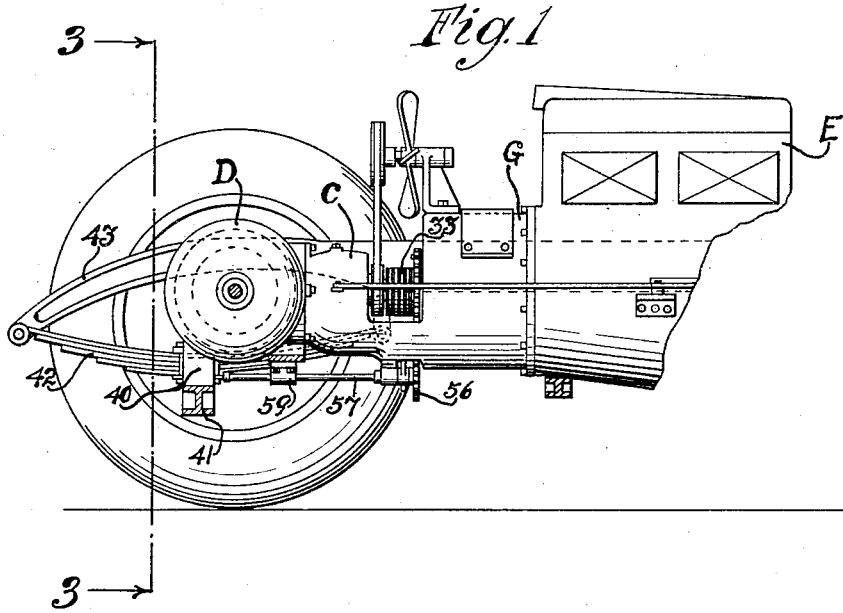
Fig. 1 is a part side elevational and part longitudinal vertical sectional view of the forward portion of an automobile with my invention applied thereto.

The form of my invention illustrated herein is shown applied to an automobile equipped with electric driving means, which includes means for driving the front wheels thereof and comprises an engine E, a dynamo electric machine G, a change speed gear mechanism or transmission mechanism C, and a differential mechanism D. The engine has its shaft 21 connected with a spider 23 so as to drive the same and the connected field element 24 of the machine G, and thereby drive the armature 25 and its connected shaft 26 which extends forwardly and is aligned with engine shaft 21. Said shaft 26 is effective in actuating the collector rings 33 mounted forwardly thereon, and the gears of the transmission mechanism C, thereby driving the front differential mechanism D and the front wheels of the automobile.

Figure 3:
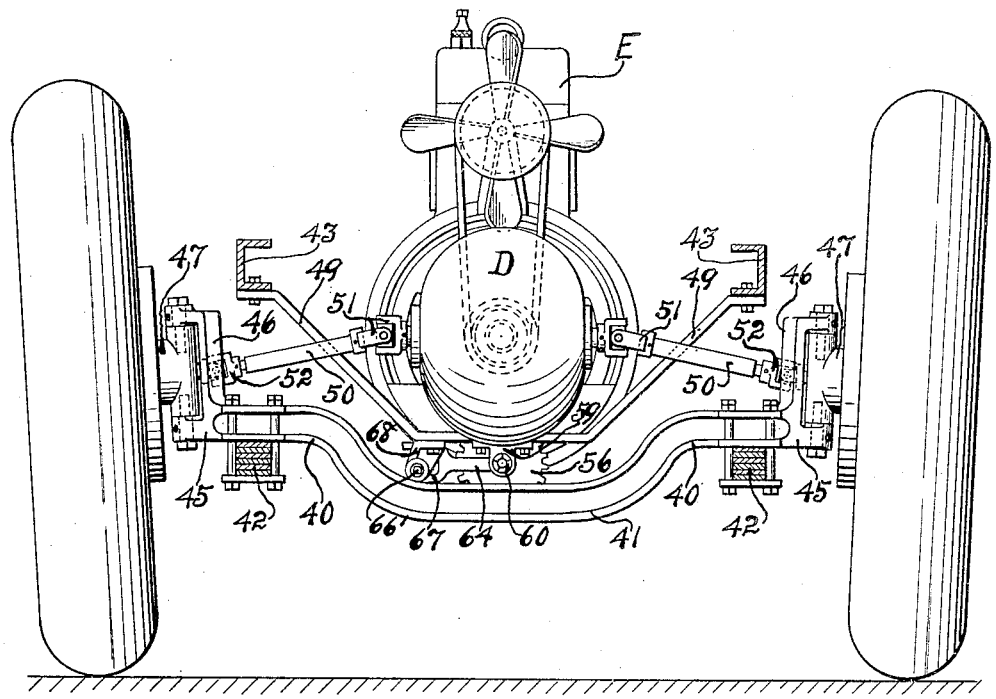
Fig. 3 is an enlarged vertical sectional view taken on line 3—3 of Fig. 1, showing the front part of the automobile with my invention thereon.

This automobile has its front axle 40 placed forwardly of the axial line through the front wheels and is provided with a downwardly and forwardly curved intermediate portion 41, as best shown in Fig. 3; so as to provide ample freedom of movement for the front differential mechanism D, relative to the front axle. The front springs 42 are supported by said axle and have their front ends connected to the frame bars 43 of the automobile, said axle having each end portion 45 curved rearwardly and provided with a yoke 46 wherein the steering knuckle 47 of one of the front wheels is pivoted. Strap means 49 is secured at its ends to said frame bars 43, and on the middle part thereof is supported the front differential mechanism D, so as to have ample freedom of movement above the axle, when the springs are flexed or depressed.

The front driving means or transverse drive shaft means in this automobile comprises a pair of shaft sections 50, which are connected at the inner ends through universal joints 51 with the two sides of the front differential gear mechanism and are connected at their outer ends through universal joints 52 with the stub shafts of the front wheels, for driving the wheels.

My novel and improved engine cranking mechanism, which forms the subject matter of this divisional application, has been more particularly provided and arranged to suit the front drive type of automobile including the above stated members and mechanisms, which are more fully disclosed and included in the referred to parent case.

Figure 2:
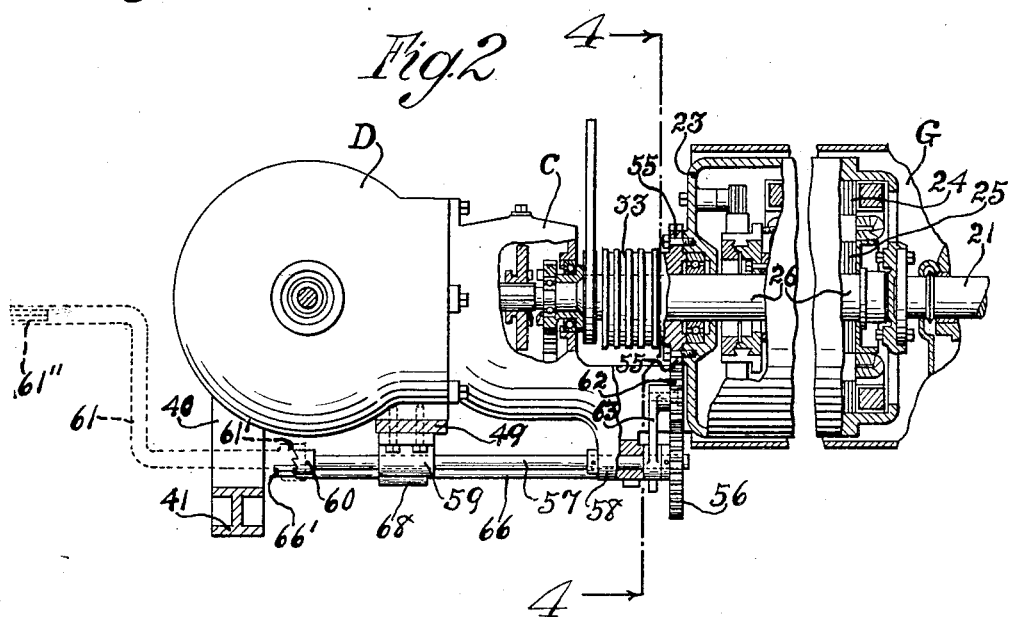
Fig. 2 is a longitudinal vertical sectional view, on a larger scale than in Fig. 1, showing my novel engine cranking means mounted thereon.

This novel cranking mechanism presented herein is arranged to have its shaft means extend alongside the transmission mechanism and the differential mechanism and comprises a member 55, which is preferably in the form of a spur gear or annular gear member secured to the front of spider 23, to be concentric with the engine shaft 21 and the armature shaft 23, and is positioned at the rear of collector rings 33, rearwardly of the transmission mechanism, as best shown in Fig. 2. A member 56, likewise in the form of a gear, is secured on the rear end of a rotatable operating shaft 57 which is supported in bearing knuckles 58 and 59 and has suitable engaging means 60 on its front end, preferably a clutch element with clutch teeth thereon, to be engaged and turned by cooperating engaging means 61' as clutch teeth, on one end of a suitable starting crank or crank lever 61. An idler 62 is pivotally mounted on the upper arm 63 of a bellcrank 64 which is fulcrumed on shaft 57. An eccentric 65 secured on the rear end of a control shaft 66 engages and turns in forked means 67 on one end of the bellcrank to swing the latter, said shaft 66 being mounted in bracket means 68, so as to extend alongside of and substantially parallel to shaft 57; and said shaft 66 has suitable means 66', as a squared front end, also adapted to be fitted by cooperating means 61'' provided on the end of said crank lever 61, opposite said means 61', to actuate said shaft 66 by the lever.

Figure 4:
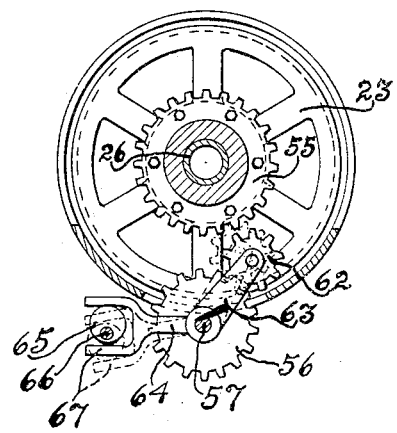
Fig. 4 is a vertical cross sectional view, taken on line 4—4 of Fig. 2.

In operating this cranking mechanism, by turning crank lever 61, control shaft 66 and its eccentric 65 will be actuated and the bellcrank 64 will be swung to positively move and hold the idler 62 in mesh with gear 55, while it is constantly in mesh with the other gear 56 secured on shaft 57. Thereupon the turning of operating shaft 57 with the crank lever will actuate the gears for cranking the engine, while these elements are in the position shown by the dotted lines in Fig. 4. After the cranking of the engine has been accomplished, the bellcrank 64 can be again swung back and the idler 62 thereby positively moved and held out of the operative position, as shown by the full lines in said Fig. 4.

With this arrangement of cranking mechanisms it is not necessary to continually run several meshing gears which belong to this mechanism, while the engine is running; but idler 62 is positively released and held apart from gear 55 which rotates with engine shaft 21 and armature shaft 23; thereby avoiding the ordinary and unnecessary wearing and noise of rotating meshed gears included in the known cranking mechanisms used in this type of automobile equipped with front wheel driving means.

The operating shaft 87 and the control shaft 96, as well as the gears 85, 86 and 92, are herein positioned outside of the differential mechanism and the transmission mechanism; and it can thus be observed whether the gears are operatively engaged or are disengaged, and if the cranking mechanism functions properly.

I claim as my invention:

1. In an automobile provided with transmission mechanism and an engine and means for driving said mechanism by said engine, a member mounted on said driving means and concentric of the shaft of said engine to turn therewith, an operating shaft and operating means thereon, a bellcrank journalled on said operating shaft and having means thereon engaging said operating means and to be moved into engagement with said member to actuate it, and shaft means alongside of said operating shaft and extending beyond said transmission mechanism and including means for swinging said bellcrank and the means thereon positively into and out of operative engagement with said member and to hold them in position, said extending shaft means with the bellcrank and also said operating shaft being separably engageable and operable from the outside of said transmission mechanism for cranking the engine.

2. In an automobile provided with a differential mechanism and transmission mechanism and an engine for driving said mechanisms, a member mounted concentric of the shaft of said engine to rotate therewith and being positioned between the engine and the transmission mechanism, an operating shaft extending along said mechanisms journalled on said operating shaft and carrying a member thereon adjacent the first said member, swingable means and means thereon for operatively connecting said members and disconnecting the same, a control element and means thereon for actuating said swingable means, and a crank handle having means thereon for independently engaging and actuating said elements to connect said members and for actuating said operating shaft to crank the engine.

3. In an automobile provided with a differential mechanism and an engine for driving said mechanism, means for cranking said engine comprising a member mounted between said engine and said mechanism and being connected with the engine shaft to rotate therewith, an operating shaft extending along said mechanism and having a member secured on its rear part, swingable means carrying an idler thereon engaging one of said members and to be positively engaged with the other member and disengaged therefrom, a control shaft extending alongside of said mechanism and having means to turn and to hold said swingable means, and a crank handle having means thereon to engage said control shaft and actuate said swingable means to positively connect said members by said idler, said crank handle also having means thereon to engage and turn said operating shaft for operating said members to crank the engine.

4. In an automobile provided with a transmission mechanism and a differential mechanism and an engine and means for driving said mechanisms by said engine, means for cranking said engine comprising a gear connected with said driving means and thereby with the engine shaft, and being mounted concentric of the engine shaft and between the engine and the transmission mechanism, an operating shaft extending along said mechanisms and having a gear at its rear end, adjacent said first gear, a bellcrank journalled on said operating shaft and having an idler engaging one of said gears and being swingable into mesh with the second gear, a control shaft mounted alongside said operating shaft and having means thereon to positively swing said bellcrank and to retain the idler in engagement and likewise out of engagement with said second gear, and a crank handle and means thereon for operating said control shaft and also said operating shaft to crank the engine.

In testimony whereof I have signed this specification.

BROR G. JOHNSON.